United States Patent [19]

Kalina

[11] Patent Number: 5,572,871
[45] Date of Patent: Nov. 12, 1996

[54] SYSTEM AND APPARATUS FOR CONVERSION OF THERMAL ENERGY INTO MECHANICAL AND ELECTRICAL POWER

[75] Inventor: Alexander I. Kalina, Hillsborough, Calif.

[73] Assignee: Exergy, Inc., Hayward, Calif.

[21] Appl. No.: 283,091

[22] Filed: Jul. 29, 1994

[51] Int. Cl.⁶ ..................................................... F01K 25/06
[52] U.S. Cl. ............................................. 60/649; 60/673
[58] Field of Search ........................................ 60/649, 673

[56] References Cited

U.S. PATENT DOCUMENTS

| | | |
|---|---|---|
| 4,346,561 | 8/1982 | Kalina . |
| 4,489,563 | 12/1984 | Kalina . |
| 4,548,043 | 10/1985 | Kalina . |
| 4,586,340 | 5/1986 | Kalina . |
| 4,604,867 | 8/1986 | Kalina . |
| 4,732,005 | 3/1988 | Kalina . |
| 4,763,480 | 8/1988 | Kalina . |
| 4,899,545 | 2/1990 | Kalina . |
| 4,982,568 | 1/1991 | Kalina . |
| 5,029,444 | 7/1991 | Kalina . |
| 5,095,708 | 3/1992 | Kalina . |
| 5,440,882 | 8/1995 | Kalina .................................. 60/641.2 |
| 5,450,821 | 9/1995 | Kalina .................................. 122/1 R |

*Primary Examiner*—Leonard E. Heyman
*Attorney, Agent, or Firm*—Fish & Richardson

[57] ABSTRACT

Method and apparatus for implementing a thermodynamic cycle in which a gaseous working fluid is expanded to transform its energy into useable form, thereby generating a spent stream which is then condensed to produce a condensed stream. From the condensed stream the following streams are generated: a first stream having a higher percentage of a low boiling component than is included in the condensed stream, a second stream having a lower percentage of a low boiling component than is included in the condensed stream, and a third stream having the same percentage of a low boiling component as is included in the condensed stream. The first, second, and third streams are subjected to multiple distillation operations to generate a liquid working fluid which is then evaporated to generate the gaseous working fluid.

8 Claims, 4 Drawing Sheets

SYSTEM AND APPARATUS FOR CONVERSION OF THERMAL ENERGY INTO MECHANICAL AND ELECTRICAL POWER

BACKGROUND OF THE INVENTION

The invention relates generally to methods and apparatus for transforming energy from a heat source into usable form using a working fluid that is expanded and regenerated. The invention further relates to methods and apparatus for improving the heat utilization efficiency of a thermodynamic cycle.

In the Rankine cycle, a working fluid such as water, ammonia, or a freon is evaporated in an evaporator utilizing an available heat source. The evaporated gaseous working fluid is expanded across a turbine to transform its energy into usable form. The spent gaseous working fluid is then condensed in a condenser using an available cooling medium. The pressure of the condensed working medium is increased by pumping, followed by evaporation and so on to continue the cycle.

The Exergy cycle, described in U.S. Pat. No. 4,346,561, utilizes a binary or multi-component working fluid. This cycle operates generally on the principle that a binary working fluid is pumped as a liquid to a high working pressure and is heated to partially vaporize the working fluid. The fluid is then flashed to separate high and low boiling working fluids. The low boiling component is expanded through a turbine, to drive the turbine, while the high boiling component has heat recovered for use in heating the binary working fluid prior to evaporation. The high boiling component is then mixed with the spent low boiling working fluid to absorb the spent working fluid in a condenser in the presence of a cooling medium.

In applicant's further invention, referred to as the Basic Kalina cycle, the subject of U.S. Pat. No. 4,489,563, relatively lower temperature available heat is utilized to effect partial distillation of at least a portion of a multi-component fluid stream at an intermediate pressure to generate working fluid fractions of differing compositions. The fractions are used to produce at least one main rich solution which is relatively enriched with respect to the lower boiling component, and to produce one lean solution which is relatively impoverished with respect to the lower boiling component. The pressure of the main rich solution is increased; thereafter, it is evaporated to produce a charged gaseous main working fluid. The main working fluid is expanded to a low pressure level to convert energy to usable form. The spent low pressure level working fluid is condensed in a main absorption stage by dissolving with cooling in the lean solution to regenerate an initial working fluid for reuse.

In accordance with another invention of the applicant, the subject of U.S. Pat. No. 4,604,867, a fluid may be diverted to a reheater after initial expansion in the turbine to increase the temperature available for superheating. After return to the turbine, and additional expansion, the fluid is withdrawn from the turbine and cooled in an intercooler. Afterwards, the fluid is returned to the turbine for additional expansion. The cooling of the turbine gas may provide additional heat for evaporation. Intercooling provides compensation for the heat used in reheating and may provide recuperation of heat available which would otherwise remain unused following final turbine expansion.

It would be desirable to further increase the efficiency of the aforementioned thermodynamic cycles.

SUMMARY OF THE INVENTION

It is one feature of the present invention to provide a significant improvement in the efficiency of a thermodynamic cycle by a process that includes the steps of:

expanding a gaseous working fluid to transform its energy into useable form and generating a spent stream;

condensing the spent stream producing a condensed stream;

generating from the condensed stream a first stream having a higher percentage of a low boiling component than is included in the condensed stream, a second stream having a lower percentage of a low boiling component than is included in the condensed stream, and a third stream having the same percentage of a low boiling component as is included in the condensed stream;

subjecting said first, second, and third streams to multiple distillation operations to generate a liquid working fluid; and evaporating the liquid working fluid to generate the gaseous working fluid.

In preferred embodiments, the multiple distillation operations yield generate a vapor stream which is condensed to generate the liquid working fluid, and a liquid stream which is mixed with the spent working fluid. It is preferably to perform the distillation in at least two stages (and more preferably in at least three stages).

In one particularly preferred embodiment, the first, second, and third streams are generated as follows. The condensed stream is divided into first and second substreams. The pressure of the first substream is increased to form a first pressurized substream. Similarly, the pressure of the second substream is increased to form a second pressurized substream; the pressure of the second pressurized substream is greater than the pressure of the first pressurized substream. The first pressurized substream is partially evaporated to form a partially evaporated stream, which is then separated into a vapor stream and a liquid stream. The pressure of the liquid stream is increased to the same level as the second pressurized substream to form a stream having a lower percentage of a low boiling component than is included in the condensed stream (i.e., the second stream). The vapor stream is mixed with a portion of the first pressurized substream to form a composite stream having the same composition as the condensed stream, which is then condensed to form a condensed composite stream. The pressure of the condensed composite stream is increased to a level equal to that of the second pressurized substream to form a pressurized condensed composite stream, which is then heated (along with the second pressurized substream) to form, respectively, a stream having the same composition as the condensed stream (i.e., the third stream) and a stream having a higher percentage of a low boiling component than is included in the condensed stream (i.e., the first stream).

Other features and advantages of the invention will be apparent from the following description of the preferred embodiments thereof, and from the claims.

DESCRIPTION OF THE PREFERRED EMBODIMENTS

Figure 1:
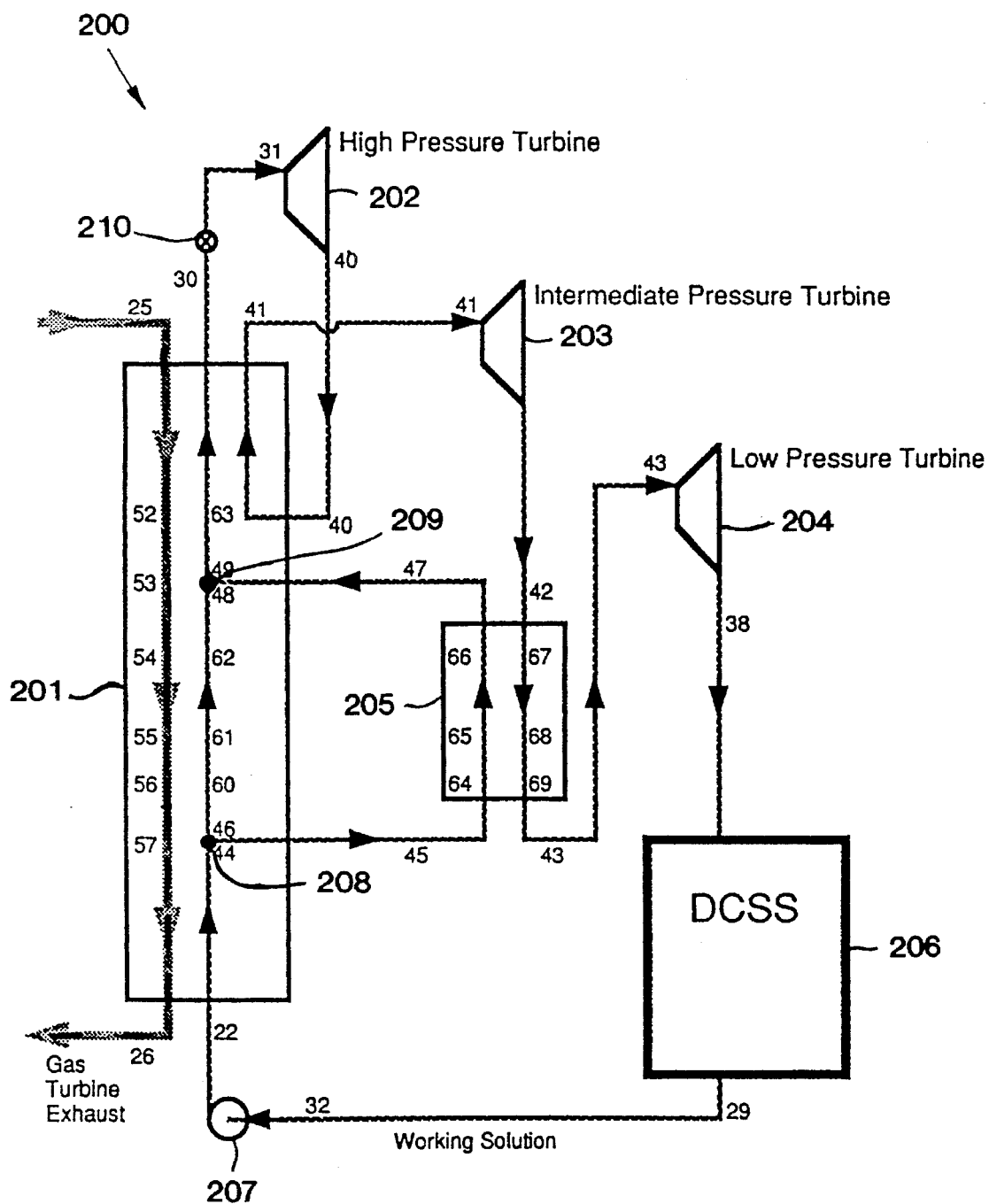
FIG. 1 is a schematic representation of a system for carrying out the method and apparatus of the present invention.

The schematic shown in FIG. 1 shows an embodiment of preferred apparatus that may be used in the method and system of the present invention. Specifically, FIG. 1 shows a system 200 that includes a boiler 201, turbines 202, 203, and 204, intercooler 205, distillation condensation subsystem (DCSS) 206, pump 207, stream separator 208, stream mixer 209, and admission valve 210.

Various types of heat sources may be used to drive the cycle of this invention, including for example, gas turbine exhaust gases. In this regard, the system of the present invention may be used as a bottoming cycle in combined cycle systems.

The working stream flowing through system 200 is a multi-component working stream that comprises a lower boiling point fluid (the low boiling component) and a higher boiling point fluid (the high boiling component). Preferred working streams include ammonia-water mixtures, mixtures of two or more hydrocarbons, two or more freons, mixtures of hydrocarbons and freons, or the like. In general, the working stream may be a mixture of any number of compounds with favorable thermodynamic characteristics and solubility. In a particularly preferred embodiment, a mixture of water and ammonia is used.

As shown in FIG. 1, a completely condensed working fluid having parameters as at 22 passes through the preheater portion of heat recovery boiler 201 where it is heated to a temperature a few degrees below its boiling temperature and obtains parameters as at 44. This preheating is provided by the cooling of all streams of a heat source indicated in dashed lines through boiler 201. The working fluid which exits the preheater is divided by stream separator 208 into two separate streams having parameters as at 45 and 46, respectively.

A first stream having parameters as at 46 enters the evaporator portion of boiler 201 while the second stream (having parameters as at 45) enters intercooler 205. The first stream is heated in the evaporator by the countercurrent heating fluid flow described above, obtaining parameters as at 48. The second fluid stream passing through the intercooler 205 is heated by countercurrent fluid flow, thereby obtaining parameters as at 47. Both the first and second streams are completely evaporated and initially superheated. Each of the streams has approximately the same pressure and temperature but the streams may have different flow rates. The fluid streams from the evaporator and intercooler 205 are then recombined by stream mixer 209, thereby obtaining parameters as at 49.

The combined stream of working fluid is sent into the superheater portion of boiler 201 where it is finally superheated by heat exchange with the heat source stream described above and obtains parameters as at 30. Thus, the heat source stream extending from point 25 to point 26 passes first through the superheater, then through the evaporator, and finally through the preheater. The enthalpy-temperature characteristics of the illustrated heating fluid stream is linear.

From the superheater portion of boiler 201, the total stream of working fluid (having parameters as at 30) passes through admission valve 210, thereby obtaining parameters as at 31, and enters a first turbine 202 which may include a number of stages. In turbine 202, the working fluid expands to a first intermediate pressure, thereby converting thermal energy into mechanical energy, and obtains parameters as at 40.

The whole working fluid stream from turbine 202 (having parameters as at 40) is reheated by passing again through boiler 201 using heat generated by the countercurrent fluid flow through boiler 201 described above and obtains parameters as at 41. Having been reheated to a high temperature, the stream of working fluid leaves boiler 201 and travels to a second turbine 203 which may include a number of stages.

The working fluid in turbine 203 is expanded from the first intermediate pressure to a second intermediate pressure, thus generating power. The total stream of working fluid (having parameters as at 42) is then sent to intercooler 205 where it is cooled, providing the heat necessary for the evaporation of the second working fluid stream. Intercooler 205 may be a simple heat exchanger. The working fluid stream (having parameters as at 43) then exits intercooler 205 and travels to a third turbine 204 (which may also include multiple stages).

In turbine 204, the working fluid expands to the final spent fluid pressure level, thus producing additional power. From turbine 204 the working fluid stream (having parameters as at 38) is passed through distillation condensation subsystem (DCSS) 206 where it is condensed (thereby obtaining parameters as at 29), pumped to a higher pressure by pump 207 (thereby obtaining parameters as at 32), and sent to boiler 201 to continue the cycle.

The distillation condensation subsystem (DCSS) 206 will now be described.

Figure 2:
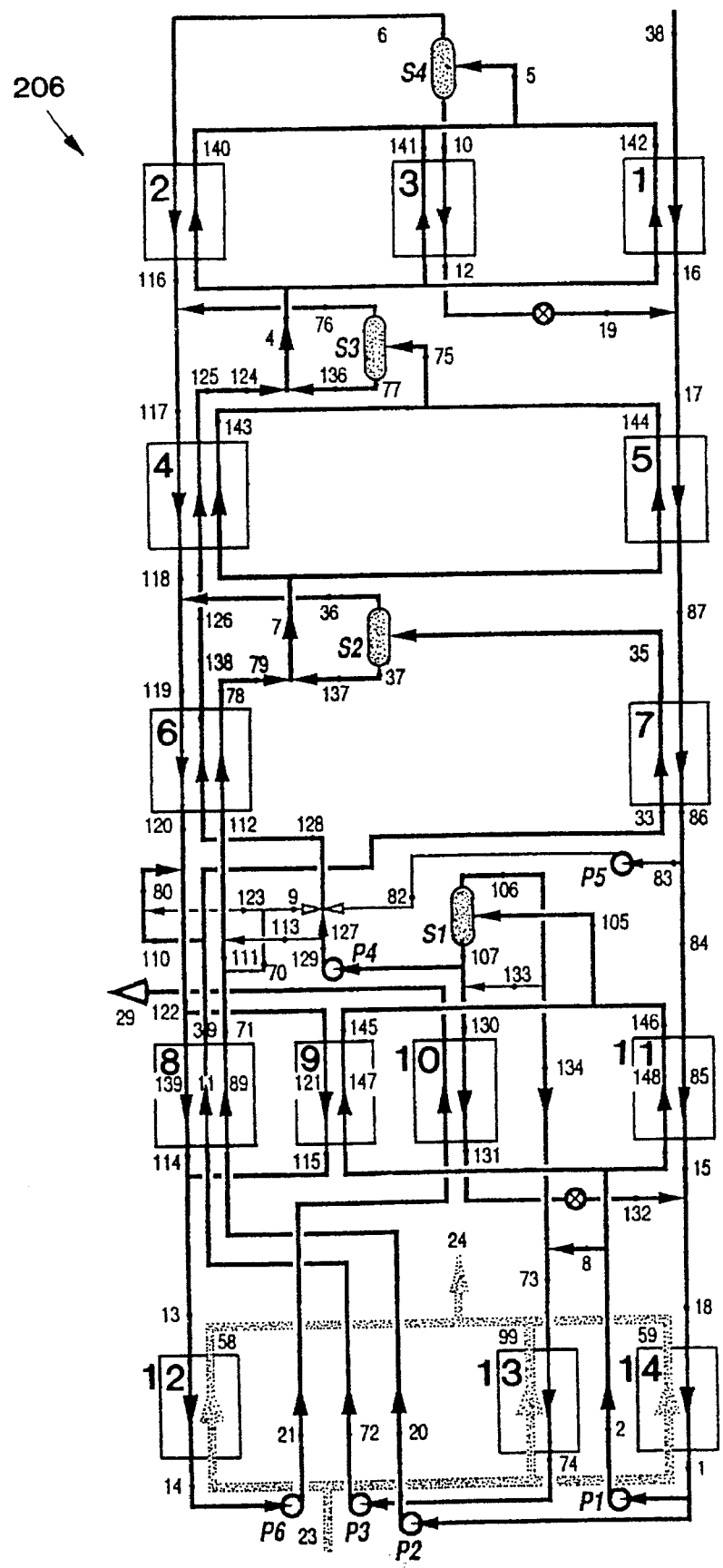
FIG. 2 is a schematic representation of one embodiment of a distillation condensation subsystem that may be used in the present invention.
Figure 3:
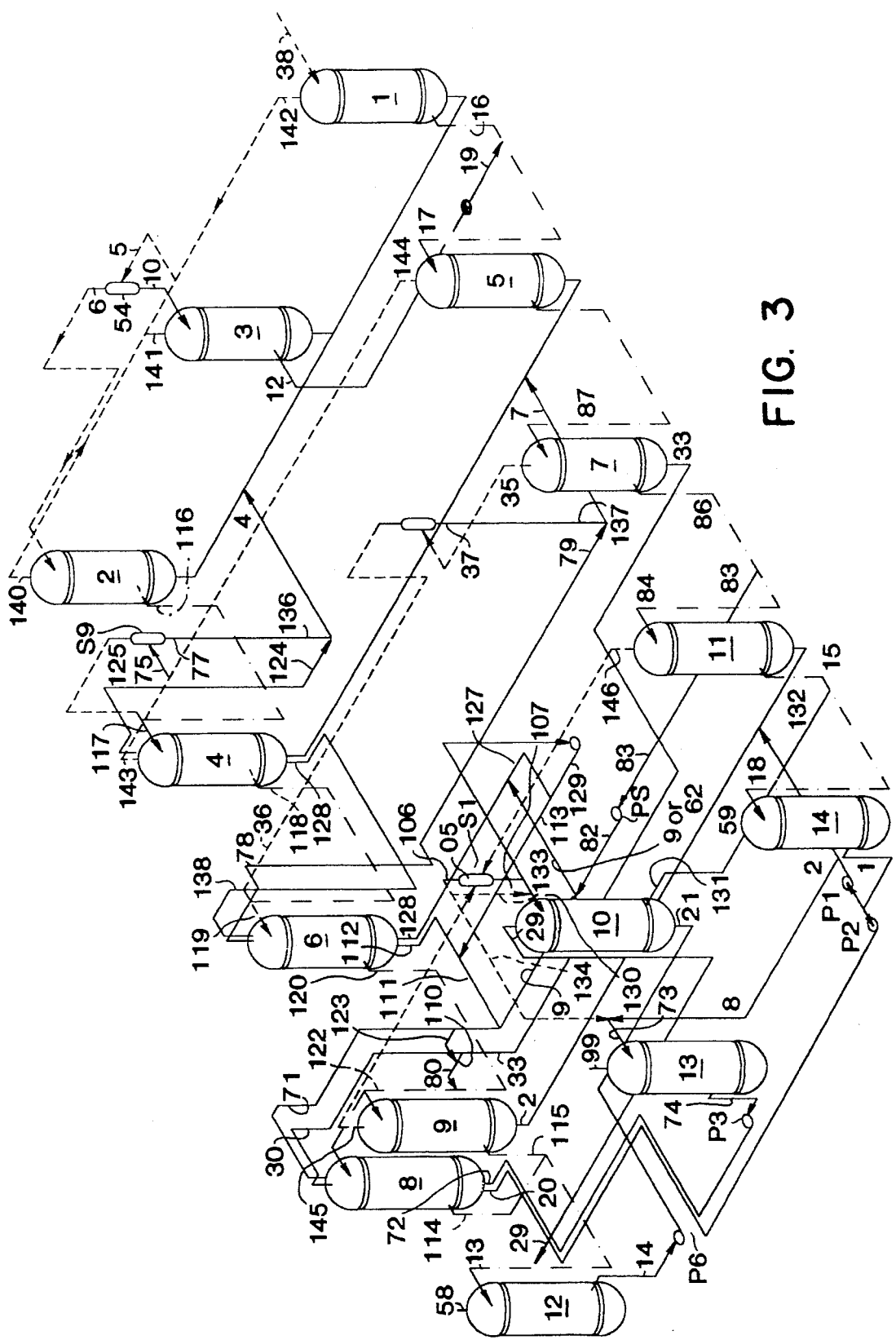
FIG. 3 is an axonometric representation of the distillation condensation subsystem shown in FIG. 2.

Referring to FIGS. 2 and 3, the working fluid exiting low pressure turbine 204 (in the form of a saturated vapor having parameters as at point 38), passes through heat exchanger 1 where it is partially condensed and cooled, yielding a stream having parameters as at point 16. Thereafter, this stream is mixed with a second stream of liquid having parameters as at point 19 and in thermodynamic equilibrium with the stream having parameters as at point 16. The stream having parameters as at point 19 contains less low boiling component (e.g., ammonia) than the stream having parameters as at point 16 and is thus said to be "lean" relative to the stream having parameters as at point 16.

Mixing the two streams yields a third stream having parameters as at 17. Because the stream having parameters as at point 19 is leaner than the stream having parameters as at point 16, the composition of this third stream produced as a result of mixing the first and second streams is also lean relative to the first stream (i.e., the stream having parameters as at point 16).

The third stream with parameters as at point 17 passes through heat exchanger 5 where it further cooled and condensed, obtaining parameters as at point 87. Thereafter, the third stream passes to heat exchanger 7 where it is further cooled and condensed, obtaining parameters as at point 86 (where it is in the form of a mixture of vapor and liquid). A small portion of the liquid (having parameters as at point 83) can be separated and extracted from the third stream at point 86 and as a result the third stream obtains parameters as at point 84. Thereafter, the third stream (having parameters as at point 84) passes through heat exchanger 11 where it is further cooled and condensed, obtaining parameters as at point 15.

Next, the third stream (having parameters as at point 15) is mixed with another liquid stream having parameters as at point 132 to form yet another stream having parameters as at point 18. The composition of the stream at point 18 is such that it allows this stream to be fully condensed under the existing pressure and temperature conditions. The stream having parameters as at point 18 then passes through heat exchanger 14 where it is fully condensed by a stream of cooling water having parameters as at points 23–59 to yield a stream having parameters as at point 1.

Thereafter, the stream having parameters as at point 1 is divided into two substreams which are correspondingly pumped by pump P1 to an intermediate pressure and by pump P2 to a high pressure. As a result, after pump P1 one of the substreams obtains parameters as at point 2 and after pump P2 the other substream obtains parameters as at point 20.

A portion of the stream having parameters as at point 2 is then separated to form another stream having parameters as at point 8. The rest of the stream is divided into two additional substreams which pass, respectively, through heat exchanger 9 and heat exchanger 11, where each is preheated to boiling temperature (corresponding to points 147 and 148, respectively) and then partially boiled, obtaining parameters as at points 145 and 146, respectively. Thereafter, these two substreams are combined to create another stream having parameters as at point 105, which is then sent into gravity separator S1.

In gravity separator S1, the stream having parameters as at point 105 is separated into a stream of saturated vapor having parameters as at point 106 and a stream of saturated liquid having parameters as at point 107. The stream consisting of saturated vapor with parameters as at point 106 may, in turn, be subdivided into a first stream with parameters as at point 133 (minor portion) and a second stream with parameters as at point 134 (major portion).

The stream having parameters as at point 134 is then mixed with the stream of liquid having parameters as at point 8 (described above), creating a stream (a so-called "intermediate solution") having parameters as at point 73. The composition at point 73 is such that the stream can be fully condensed by cooling water of available temperature at its intermediate pressure. The stream having parameters as at point 73 then passes through heat exchanger 13 where it is cooled by water (stream 23–99) and fully condensed, thereby obtaining parameters as at point 74.

Thereafter, the stream having parameters as at point 74 is pumped to a high pressure by pump P3, thereby obtaining parameters as at point 72. As a result, two streams having identical high pressures but different compositions with parameters as at points 20 and 72, respectively, are created. These two streams pass through heat exchanger 8 where they are heated, obtaining parameters as at points 39 and 71, respectively.

The stream having parameters as at point 39 has a rich composition relative to the stream having parameters as at point 71. A portion of the stream having parameters as at point 107 (described above) is also pumped by pump P4 to a high pressure and thereby obtains parameters as at point 129.

As a result, three streams having parameters, respectively, as at 129, 39, and 71, have been created. These three streams have three different compositions but identical pressures. The "lean" stream has parameters as at point 129, the "intermediate" stream has parameters as at point 71, and the "rich" stream has parameters as at point 39.

A small portion of the lean stream having parameters as at point 129 is separated to form a stream having parameters as at point 113; the remaining portion of the stream then obtains parameters as at point 127. A small portion of the intermediate stream having parameters as at point 71 is also separated to form a stream having parameters as at point 70; the remaining portion of the stream then obtains parameters as at point 111. The rich stream having parameters as at point 39 is divided into two substreams having parameters, respectively, as at points 110 and 33.

The compositions of the streams having parameters as at point 129, 111, and 110, respectively may be altered. Specifically, the composition of the stream having parameters as at point 129 can be made leaner in the following way. Liquid having parameters as at point 83 (described above) is pumped by pump P5 to a pressure equal to the pressure of the stream having parameters as at point 129. After pumping, the liquid having parameters as at point 83 obtains parameters as at point 82. Because the composition of a stream with parameters as at point 82 is leaner than that of the stream having parameters as at point 127, mixing these two streams will result in a composite stream having leaner composition than that of the stream at point 127.

On the other hand, a portion of a stream having parameters as at point 70 which is extracted for intermediate composition stream, this portion having parameters as at point 9, may be added to the stream having parameters as at point 127. Because the stream having parameters as at point 9 has a richer composition than the stream having parameters as at point 127, the composite stream formed by mixing the two has a richer composition compared to the stream having parameters as at point 127.

Thus, the stream having parameters as at point 127 can be made leaner by adding a stream having parameters as at point 82, or richer by adding a stream having parameters as at point 9. Only one of these streams is added any time. As a result, a stream having parameters as at point 128 is created.

A stream having parameters as at point 113 (extracted from the stream having parameters as at point 129) may be added to the stream having parameters as at point 111 to create a stream having a slightly leaner composition (relative to the stream having parameters at point 111) and parameters as at point 112. A stream having parameters as at point 110 can also be may be made leaner by addition of a portion of the stream having parameters as at point 70, this portion having parameters as at point 123. A new stream with a slightly leaner composition (relative to the stream having parameters as at point 110) having parameters as at point 80 is thus created.

As a result of such remixing and altering the composition of the streams, four streams having four different compositions (i.e., having parameters as at points 33, 112, 128 and 80, respectively) are created.

The stream having parameters as at point 33 (which is in the form of a saturated liquid) passes through heat exchanger 7, thereby obtaining parameters as at point 35. It is then sent into gravity separator S2 where it is separated into two streams. One of the streams is in the form of a saturated vapor having parameters as at point 36, and the other stream is in the form of a saturated liquid having parameters as at point 37.

As can be seen from FIGS. 2 and 3, each stream being vaporized enters the heat exchanger from the bottom and is removed in a partially vaporized state from the top of the heat exchanger. After separation of vapor and liquid, the saturated liquid produced in such a separator is subject to further vaporization. Because such a liquid has to enter in the next heat exchanger from the bottom, excessive pressure in the pipeline leading from bottom to the top of the heat exchanger could build up. To avoid such pressure build-up, the saturated liquid leaving the gravity separator (e.g., the liquid at point 37) is subcooled to form a liquid having parameters as at point 137.

The stream with parameters as at point 112 passes through heat exchanger 6 where it is heated and obtains parameters as at point 78. Thereafter, this stream is directed down to the bottom of the heat exchanger and, because of added pressure created by hydraulic height, obtains increased pressure and has parameters as at point 79. The stream having parameters as at point 78 has a richer composition than saturated liquid would have at the temperature existing at point 79. However, because this stream also has a slightly higher pressure, boiling does not occur.

The stream having parameters as at point 79 is mixed with the stream having parameters as at point 137 (as described above) to form a composite stream having parameters as at point 7. During such mixing, the pressure of the resulting composite stream having parameters as at point 7 is reduced by means of throttling; as a result the stream at point 7 emerges in the state of a saturated liquid.

The stream with the leanest composition having parameters as at point 128 also passes through heat exchanger 6 where it is heated and obtains parameters as at point 138. Thereafter, this stream is returned to the bottom of the heat exchanger, causing its pressure to increase as a result of the height of the hydraulic column. The resulting stream obtains parameters as at point 126.

The stream with parameters as at point 7 is divided into two substreams which pass, respectively, through heat exchanger 5 and heat exchanger 4. In those two heat exchangers, these substreams are vaporized and obtain parameters, respectively, as at points 144 and 143. Thereafter, those two substreams are recombined to form a stream having parameters as at point 75, which is then sent into gravity separator S3. In separator S3 the stream having parameters as at point 75 is separated into vapor having parameters as at point 75 and saturated liquid having parameters as at point 77.

The stream with parameters as at point 126 (the lean stream) is also sent through heat exchanger 4 where it is heated and obtains parameters as at point 125. Thereafter, the streams having parameters as at points 77 and 125 are sent to the bottom of the heat exchangers and their pressure increases. As a result, these streams obtain parameters, respectively, as at points 136 and 124. Again, the stream with parameters as at point 124 has a composition which is richer than the composition of saturated liquid at the same temperature, and the stream having parameters as at point 136 has a composition which is leaner than the composition of saturated liquid at the same temperature. These two streams are then mixed to create a composite stream having parameters as at point 4 which is in the form of a saturated liquid.

The stream having parameters as at point 4 is split int three substreams which pass, respectively, through heat exchangers 1, 2, and 3 where these substreams are partially vaporized, obtaining parameters, respectively, as at points 142, 140 and 141. The three streams are then recombined to form a stream having parameters as at point 5.

The stream having parameters as at point 5 is sent into gravity separator S4 where it is separated into vapor having parameters as at point 5 and saturated liquid having parameters as at point 10. The liquid having parameters as at point 10 passes through heat exchanger 3 where it is cooled, providing heat for vaporization (as described above) and obtaining parameters as at point 12. The stream having parameters as at point 12 is then throttled to lower its pressure, thereby obtaining parameters as at point 19. The stream having parameters as at point 19 is then combined with the low pressure stream having parameters as at point 16 (described above) to create a stream having parameters as at point 17.

Vapor having parameters as at point 6 passes through heat exchanger 2 where it is partially condensed, providing heat for vaporization as described above and obtaining parameters as at point 116. The stream having parameters as at point 116 is then combined with the stream of vapor from gravity separator S3 having parameters as at point 76 (described above), producing a stream having parameters as at point 117. The stream having parameters as at point 117 then passes through heat exchanger 4 where it is further condensed and cooled, thereby providing heat for vaporization and heating as described above and obtaining parameters as at point 118. Thereafter, the stream having parameters as at point 118 is mixed with the vapor having parameters as at point 36 which leaves gravity separator S2 (described above) to create a stream having parameters as at point 119.

The stream having parameters as at point 119 then passes through heat exchanger 6 where it is further cooled and condensed, providing heat for heating the two streams of liquid passing through heat exchanger 6 (as described above) and obtaining parameters as at point 120. Thereafter, the stream having parameters as at point 120 is mixed with the stream of rich liquid having parameters as at point 80 (described above); the composition of the stream having parameters as at point 80 has been altered in such a way that this stream is in thermodynamic equilibrium with the stream having parameters as at point 120. The resulting composite stream has parameters as at point 122. The composition at point 122 is equal to the composition of vapor which has entered Distillation Condensation Subsystem 206 (i.e., the composition of the stream at point 38). However, the pressure of the stream is higher than the stream with parameters as at point 38, which allows it to be condensed by cooling water at available temperature.

The stream having parameters as at point 122 is divided into two substreams which are sent, respectively, into heat exchangers 8 and 9. In those two heat exchangers, these substreams are further cooled and condensed, thereby providing heat for vaporization in heat exchanger 9 and for heating of liquids in heat exchanger 8 (as described above), and obtaining parameters as at points 115 and 114, respectively. Thereafter, the two substreams are recombined to form a stream having parameters as at point 13, which is then sent into heat exchanger 12 where it is finally fully condensed by a stream of cooling water (23–58), thereby obtaining parameters as at point 14.

The stream having parameters as at point 14 is pumped by a booster pump P6 to elevated pressure and then sent into heat exchanger 10 where it is heated, thereby obtaining parameters as at point 29. It is then sent into boiler 201 as described above with reference to FIG. 1.

The liquid leaving left gravity separator S1 (described above) is sent into heat exchanger 10 and, upon being cooled, obtains parameters as at point 131, thereby providing heat necessary for heating water stream 21–29. In the event that the heat available from cooling this liquid is not sufficient to provide necessary heating, a small portion of the vapor from gravity separator S1 having parameters as at point 133 may be added to the liquid which is being cooled in heat exchanger 10. Condensation of this vapor provides the necessary heat balance in heat exchanger 10.

The stream having parameters as at point 131 is throttled to reduce its pressure, thereby obtaining parameters as at point 132. The stream having parameters as at point 132 is then mixed with the stream having parameters as at point 15, creating a stream having parameters as at point 18 (described above) and providing for full condensation of low pressure stream which has entered Distillation Condensation Subsystem 206 after exiting the low pressure turbine.

The cycle is closed.

Suggested parameters for the points corresponding to the points set forth in system 200 shown in FIG. 1 are presented in Table I for a system having a water-ammonia working fluid. Suggested parameters for the points corresponding to the points set forth in DCSS 206 shown in FIGS. 2 and 3 are presented in Table I for a system having a water-ammonia working fluid. A summary of the performance of the system shown in FIGS. 1–3, using the parameters shown in Tables 1 and 2, is included in Table 3.

The system of the present invention should provide for an increased thermal efficiency when compared to the system described in U.S. Pat. No. 4,604,867. As shown in Table 3, a combined cycle utilizing the proposed bottoming cycle system has a net output of 252,733.4 kWe. For comparison, the combined cycle system in accordance with U.S. Pat. No. 4,604,867 with the same gas turbine (a GE 7FA gas turbine) has a net output of 249,425 kWe, and the combined cycle with the same gas turbine using a conventional triple pressure Rankine bottoming cycle has a net output of 240,432 kWe. As follows from this data, the proposed system outperforms the most advanced combined cycle with a Rankine bottoming cycle by 12,301 kWe and outperforms the combined cycle system in accordance with U.S. Pat. No. 4,604,867 by 3,307.5 kWe.

Figure 4:
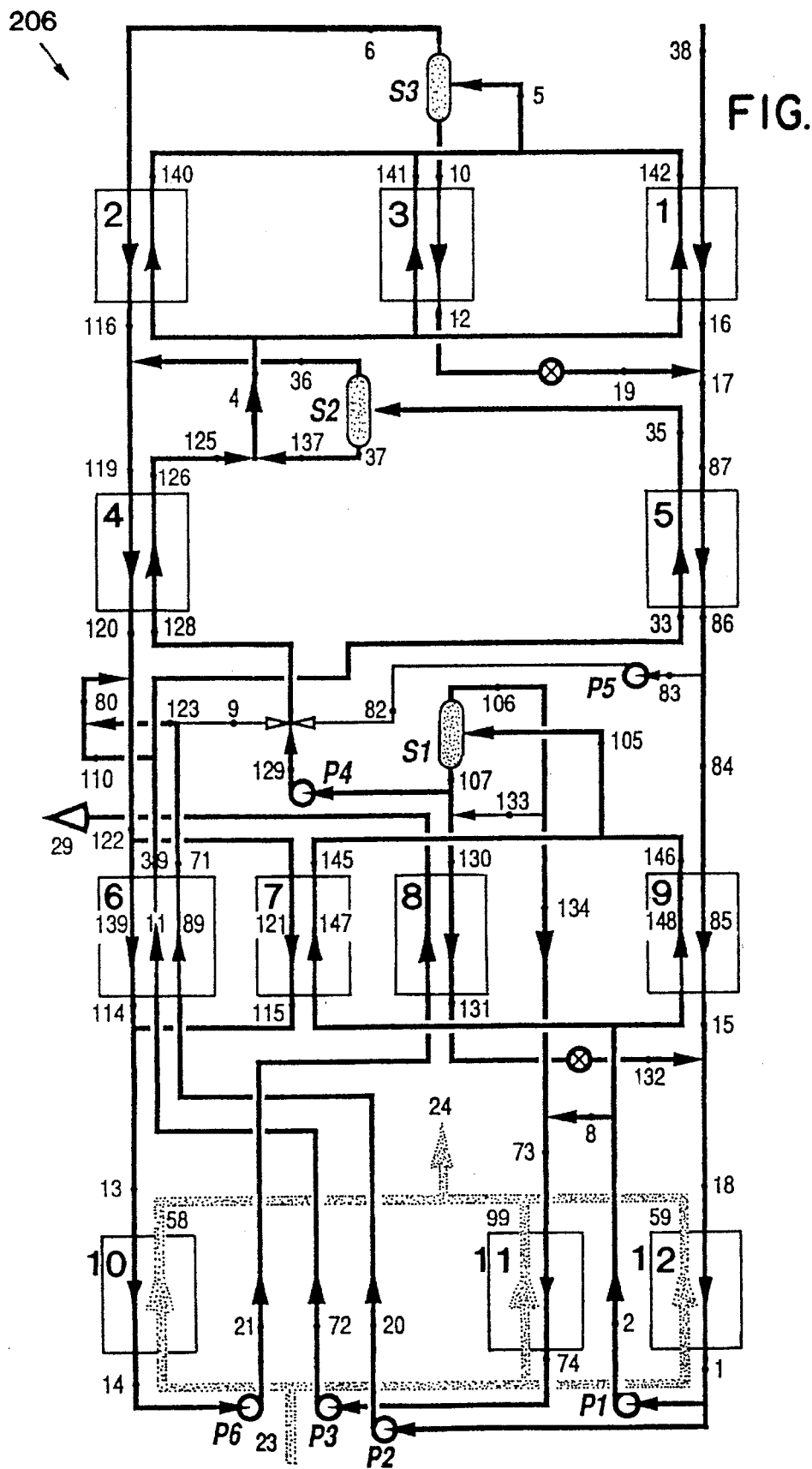
FIG. 4 is a schematic representation of a second embodiment of a distillation condensation subsystem that may be used in the present invention.

While the present invention has been described with respect to a preferred embodiment, those skilled in the art will appreciate a number of variations and modifications of that embodiment. For example, it is also possible to perform the distillation operation in two stages (as opposed to three stages, as shown in FIGS. 2 and 3) using the same principles. Such a simplified design of the proposed system is presented in FIG. 4. Although it has a somewhat lower performance (752,602 kWe vs. 752,733.4 kWe), it contains fewer heat exchangers in the Distillation Condensation Subsystem (12 vs. 14).

The number of distillation steps can also be greater than three.

TABLE 1

| DISTILLATION-CONDENSATION SUBSYSTEM POINTS | | | | | | | |
|---|---|---|---|---|---|---|---|
| # | P psiA | X | T °F. | H BTU/lb | G/G30 | Flow lb/hr | Phase |
| 1 | 44.90 | .5568 | 63.00 | −69.47 | 3.0951 | 2,414,827 | SatLiquid |
| 2 | 71.49 | .5568 | 63.05 | −69.35 | 2.4736 | 1,929,890 | Liq 25° |
| 3 | 61.49 | .5568 | 79.65 | −51.59 | 1.5737 | 1,227,803 | SatLiquid |
| 4 | 102.23 | .4814 | 127.87 | −3.62 | 1.2477 | 973,428 | SatLiquid |
| 5 | 99.23 | .4814 | 178.78 | 212.96 | 1.2477 | 973,428 | Wet .7438 |
| 6 | 99.23 | .9471 | 178.78 | 649.99 | .3196 | 249,382 | SatVapor |
| 7 | 101.83 | .5433 | 112.08 | −17.47 | 1.1246 | 877,430 | SatLiquid |
| 8 | 71.49 | .5568 | 63.05 | −69.35 | .8999 | 702,087 | Liq 25° |
| 9 | 110.39 | .5568 | 93.19 | −36.86 | .0679 | 53,014 | Liq 21° |
| 10 | 99.23 | .3210 | 178.78 | 62.43 | .9280 | 724,046 | SatLiquid |
| 11 | 105.87 | .6365 | 88.03 | −33.03 | .0000 | 0 | Liq 8° |
| 12 | 99.23 | .3210 | 131.87 | 12.79 | .9280 | 724,046 | Liq 47° |
| 13 | 97.68 | .8500 | 78.50 | 252.60 | 1.0000 | 780,206 | Wet .5256 |
| 14 | 97.38 | .8500 | 63.00 | −11.76 | 1.0000 | 780,206 | SatLiquid |
| 15 | 45.20 | .5954 | 81.13 | 86.94 | 1.9280 | 1,504,253 | Wet .777 |
| 16 | 46.35 | .8500 | 132.01 | 511.68 | 1.0000 | 780,206 | Wet .1797 |
| 17 | 46.35 | .5954 | 132.01 | 271.55 | 1.9280 | 1,504,253 | Wet .5745 |
| 18 | 45.20 | .5568 | 79.17 | 29.65 | 3.0951 | 2,414,827 | Wet .8648 |
| 19 | 46.35 | .3210 | 132.01 | 12.79 | .9280 | 724,046 | SatLiquid |
| 20 | 130.39 | .5568 | 63.17 | −69.10 | .6215 | 484,936 | Liq 62° |
| 21 | 216.54 | .8500 | 63.33 | −11.15 | 1.0000 | 780,206 | Liq 50° |
| 23 | . | Water | 57.00 | 25.00 | 44.0603 | 34,376,098 | |
| 58 | . | Water | 70.74 | 38.74 | 19.2413 | 15,012,208 | |
| 59 | . | Water | 75.02 | 43.02 | 17.0232 | 13,281,579 | |
| 99 | . | Water | 72.41 | 40.41 | 7.7958 | 6,082,312 | |
| 24 | . | Water | 72.69 | 40.69 | 44.0603 | 34,376,098 | |
| 29 | 196.54 | .8500 | 89.19 | 17.36 | 1.0000 | 780,206 | Liq 17° |
| 33 | 101.43 | .6365 | 93.19 | −27.44 | .8963 | 699,325 | SatLiquid |
| 35 | 98.43 | .6365 | 112.08 | 116.07 | .8963 | 699,325 | Wet .7783 |
| 36 | 98.43 | .9952 | 112.08 | 587.00 | .1987 | 155,062 | SatVapor |
| 37 | 98.43 | .5343 | 112.08 | −18.10 | .6976 | 544,263 | SatLiquid |
| 38 | 46.75 | .8500 | 184.58 | 707.60 | .9904 | 772,706 | SatVapor |
| 39 | 102.43 | .6365 | 93.19 | −27.41 | 1.0996 | 857,879 | Liq 1° |
| 70 | 0.00 | .5568 | 0.00 | 0.00 | .2019 | 157,548 | |
| 71 | 110.39 | .5568 | 93.19 | −36.86 | .6215 | 484,936 | Liq 21° |
| 72 | 122.43 | .6365 | 63.14 | −59.97 | 1.0996 | 857,879 | Liq 42° |
| 73 | 59.99 | .6365 | 76.58 | 48.98 | 1.0996 | 857,879 | Wet .835 |
| 74 | 59.69 | .6365 | 63.00 | −60.25 | 1.0996 | 857,879 | SatLiquid |
| 75 | 98.83 | .5433 | 127.87 | 77.52 | 1.1246 | 877,430 | Wet .865 |
| 76 | 98.83 | .9898 | 127.87 | 599.11 | .1518 | 118,454 | SatVapor |

TABLE 1-continued

DISTILLATION-CONDENSATION SUBSYSTEM POINTS

| # | P psiA | X | T °F. | H BTU/lb | G/G30 | Flow lb/hr | Phase |
|---|--------|------|--------|----------|--------|------------|-----------|
| 77 | 98.83 | .4736 | 127.87 | −3.88 | .9728 | 758,976 | SatLiquid |
| 78 | 108.39 | .5581 | 112.08 | −16.23 | .4270 | 333,167 | Liq 1° |
| 79 | 116.43 | .5581 | 112.08 | −16.22 | .4270 | 333,167 | Liq 5° |
| 80 | 98.03 | .6041 | 93.95 | −31.25 | .3298 | 257,309 | Liq 3° |
| 81 | 102.43 | .6365 | 93.19 | −27.41 | .0074 | 5,779 | Liq 1° |
| 82 | 137.48 | .4235 | 97.35 | −35.94 | .0000 | 0 | Liq 67° |
| 83 | 45.55 | .4235 | 97.19 | −36.33 | .0000 | 0 | SatLiquid |
| 84 | 45.55 | .5954 | 97.19 | 152.92 | 1.9280 | 1,504,253 | Wet .6974 |
| 85 | 45.35 | .5954 | 83.65 | 97.81 | 1.9280 | 1,504,253 | Wet .7634 |
| 86 | 45.55 | .5954 | 97.19 | 152.92 | 1.9280 | 1,504,253 | Wet .6974 |
| 87 | 45.95 | .5954 | 116.08 | 219.59 | 1.9280 | 1,504,253 | Wet .626 |
| 89 | 105.87 | .5568 | 88.03 | −42.45 | .0000 | 0 | Liq 23° |
| 105 | 59.99 | .5568 | 93.19 | 38.45 | 1.5737 | 1,227,803 | Wet .8731 |
| 106 | 59.99 | .9956 | 93.19 | 582.24 | .1997 | 155,798 | SatVapor |
| 107 | 59.99 | .4930 | 93.19 | −40.59 | 1.3740 | 1,072,006 | SatLiquid |
| 108 | 59.99 | .9956 | 93.19 | 582.24 | .1997 | 155,792 | SatVapor |
| 109 | 59.99 | .9956 | 93.19 | 582.24 | .1997 | 155,792 | SatVapor |
| 110 | 98.03 | .6365 | 91.39 | −27.41 | .1958 | 152,775 | Wet .9963 |
| 111 | 110.39 | .5568 | 93.19 | −36.86 | .4196 | 327,388 | Liq 21° |
| 112 | 128.39 | .5581 | 93.19 | −36.71 | .4270 | 333,167 | Liq 30° |
| 113 | 137.48 | .4930 | 93.33 | −40.25 | .0000 | 0 | Liq 51° |
| 114 | 97.68 | .8500 | 75.32 | 224.52 | .4419 | 344,788 | Wet .5731 |
| 115 | 97.68 | .8500 | 81.58 | 274.84 | .5581 | 435,418 | Wet .489 |
| 116 | 98.83 | .9471 | 135.01 | 561.70 | .3196 | 249,382 | Wet .0724 |
| 117 | 98.83 | .9608 | 132.98 | 573.75 | .4715 | 367,835 | Wet .0494 |
| 118 | 98.43 | .9608 | 117.33 | 549.65 | .4715 | 367,835 | Wet .0683 |
| 119 | 98.43 | .9710 | 116.08 | 560.72 | .6702 | 522,898 | Wet .0484 |
| 120 | 98.03 | .9710 | 100.27 | 539.33 | .6702 | 522,898 | Wet .065 |
| 121 | 97.83 | .8500 | 83.65 | 287.37 | .5581 | 435,418 | Wet .4688 |
| 122 | 98.03 | .8500 | 97.60 | 350.88 | 1.0000 | 780,206 | Wet .3738 |
| 123 | 98.03 | .5568 | 93.21 | −36.86 | .1340 | 104,534 | Liq 14° |
| 124 | 116.83 | .5087 | 127.87 | −2.22 | .2749 | 214,452 | Liq 1° |
| 125 | 135.48 | .5087 | 127.87 | −2.22 | .2749 | 214,452 | Liq 1° |
| 126 | 135.48 | .5087 | 112.08 | −19.37 | .2749 | 214,452 | Liq 27° |
| 127 | 137.48 | .4930 | 93.33 | −40.25 | .2069 | 161,438 | Liq 51° |
| 128 | 137.48 | .5087 | 93.19 | −39.72 | .2749 | 214,452 | Liq 47° |
| 129 | 137.48 | .4930 | 93.33 | −40.25 | .2069 | 161,438 | Liq 51° |
| 130 | 59.99 | .4930 | 93.19 | −40.58 | 1.1671 | 910,574 | SatLiquid |
| 131 | 59.69 | .4930 | 70.28 | −65.01 | 1.1671 | 910,574 | Liq 23° |
| 132 | 45.20 | .4930 | 70.31 | −65.01 | 1.1671 | 910,574 | Liq 8° |
| 133 | 59.99 | .9956 | 93.19 | 582.24 | .0000 | 6 | SatVapor |
| 134 | 59.99 | .9956 | 93.19 | 582.24 | .1997 | 155,792 | SatVapor |
| 135 | 59.99 | .4930 | 93.19 | −40.59 | 1.1671 | 910,568 | SatLiquid |
| 136 | 116.83 | .4736 | 127.87 | −3.81 | .9728 | 758,976 | Liq 11° |
| 137 | 116.43 | .5343 | 112.08 | −18.04 | .6976 | 544,263 | Liq 11° |
| 138 | 117.48 | .5087 | 112.08 | −19.40 | .2749 | 214,452 | Liq 17° |
| 139 | 98.01 | .8500 | 92.03 | 328.97 | .4406 | 343,741 | Wet .405 |
| 140 | 99.23 | .4814 | 174.78 | 198.56 | .1396 | 108,902 | Wet .7587 |
| 141 | 99.23 | .4814 | 174.78 | 198.56 | .2279 | 177,772 | Wet .7587 |
| 142 | 99.23 | .4814 | 180.45 | 218.96 | .8802 | 686,754 | Wet .7377 |
| 143 | 98.83 | .5433 | 127.87 | 77.52 | .0701 | 54,700 | Wet .865 |
| 144 | 98.83 | .5433 | 127.87 | 77.52 | 1.0545 | 822,730 | Wet .865 |
| 145 | 59.99 | .5568 | 93.19 | 38.45 | .3937 | 307,159 | Wet .8731 |
| 146 | 59.99 | .5568 | 93.19 | 38.45 | 1.1800 | 920,644 | Wet .8731 |
| 147 | 61.49 | .5568 | 79.65 | −51.59 | .3937 | 307.159 | SatLiquid |
| 148 | 61.49 | .5568 | 79.65 | −51.59 | 1.1800 | 920,644 | SatLiquid |

TABLE 2

KALINA CYCLE SYSTEM POINTS

| # | P psiA | X | T °F. | H BTU/lb | G/G30 | Flow lb/hr | Phase |
|---|--------|------|---------|----------|--------|------------|-----------|
| 22 | 2814.00 | .8500 | 98.22 | 31.46 | 1.0000 | 780,206 | Liq 274° |
| 22a | 2810.31 | .8500 | 107.78 | 41.74 | 1.0000 | 780,206 | Liq 265° |
| 25 | . | Gas | 1102.40 | 282.23 | 4.3791 | 3,416,630 | |
| 26 | . | Gas | 116.29 | 21.10 | 4.3791 | 3,416,630 | |
| 26a | . | Gas | 125.79 | 23.49 | 4.3791 | 3,416,630 | |
| 29 | 196.54 | .8500 | 89.19 | 17.36 | 1.0000 | 780,206 | Liq 17° |
| 30 | 2549.00 | .8500 | 1036.43 | 1215.89 | 1.0000 | 780,206 | Vap 664° |
| 31 | 2415.00 | .8500 | 1035.00 | 1215.89 | .9548 | 744,947 | Vap 661° |
| 32 | 151.18 | .8500 | 89.20 | 17.36 | 1.0000 | 780,206 | Wet .9998 |
| 38 | 46.75 | .8500 | 184.58 | 707.60 | .9904 | 772,706 | SatVapor |

TABLE 2-continued

KALINA CYCLE SYSTEM POINTS

| # | P psiA | X | T °F. | H BTU/lb | G/G30 | Flow lb/hr | Phase |
|---|--------|-----|---------|----------|--------|------------|-----------|
| 40 | 750.00 | .8500 | 805.60 | 1063.94 | .9363 | 730,518 | Vap 466° |
| 41 | 671.40 | .8500 | 1025.00 | 1220.47 | .9815 | 765,777 | Vap 693° |
| 42 | 81.17 | .8500 | 607.59 | 948.05 | .9954 | 776,587 | Vap 396° |
| 43 | 76.17 | .8500 | 251.16 | 741.22 | .9924 | 774,245 | Vap 43° |
| 44 | 2764.00 | .8500 | 227.85 | 178.20 | 1.0000 | 780,206 | Liq 145° |
| 45 | 2764.00 | .8500 | 227.85 | 178.20 | .3413 | 266,281 | Liq 145° |
| 46 | 2764.00 | .8500 | 227.85 | 178.20 | .6587 | 513,925 | Liq 145° |
| 47 | 2684.00 | .8500 | 517.19 | 781.40 | .3413 | 266,281 | Vap 145° |
| 48 | 2684.00 | .8500 | 517.19 | 781.40 | .6587 | 513,925 | Vap 145° |
| 49 | 2684.00 | .8500 | 517.19 | 781.40 | 1.0000 | 780,206 | Vap 145° |
| 52 | . | Gas | 823.49 | 205.05 | 4.3791 | 3,416,630 | |
| 53 | . | Gas | 607.59 | 147.24 | 4.3791 | 3,416,630 | |
| 54 | . | Gas | 435.61 | 102.33 | 4.3791 | 3,416,630 | |
| 55 | . | Gas | 435.61 | 102.33 | 4.3791 | 3,416,630 | |
| 56 | . | Gas | 435.61 | 102.33 | 4.3791 | 3,416,630 | |
| 57 | . | Gas | 251.16 | 55.12 | 4.3791 | 3,416,630 | |
| 60 | 2750.00 | .8500 | 372.50 | 487.31 | .6587 | 513,925 | Vap 0° |
| 61 | 2750.00 | .8500 | 372.50 | 487.31 | .6587 | 513,925 | Vap 0° |
| 62 | 2750.00 | .8500 | 372.50 | 487.31 | .6587 | 513,925 | Vap 0° |
| 63 | 2604.00 | .8500 | 805.60 | 1030.75 | 1.0000 | 780,206 | Vap 433° |
| 64 | 2750.00 | .8500 | 372.50 | 487.31 | .3413 | 266,281 | Vap 0° |
| 65 | 2750.00 | .8500 | 372.50 | 487.31 | .3413 | 266,281 | Vap 0° |
| 66 | 2750.00 | .8500 | 372.50 | 487.31 | .3413 | 266,281 | Vap 0° |
| 67 | 79.92 | .8500 | 439.01 | 847.21 | .9954 | 776,587 | Vap 228° |
| 68 | 79.92 | .8500 | 439.01 | 847.21 | .9954 | 776,587 | Vap 228° |
| 69 | 79.92 | .8500 | 439.01 | 847.21 | .9954 | 776,587 | Vap 228° |
| 88 | 671.40 | .8500 | 1026.83 | 1221.80 | .9363 | 730,518 | Vap 694° |
| 92 | 76.17 | .8500 | 251.16 | 741.22 | .0030 | 2,342 | Vap 43° |
| 93 | 81.17 | .8500 | 789.94 | 1063.94 | .0020 | 1,555 | Vap 579° |
| 94 | 750.00 | .8500 | 805.60 | 1063.94 | .0165 | 12,874 | Vap 466° |
| 95 | 2050.90 | .8500 | 1001.86 | 1193.02 | .0452 | 35,259 | Vap 611° |
| 96 | 81.17 | .8500 | 604.42 | 946.09 | .0026 | 2,064 | Vap 393° |
| 97 | 46.75 | .8500 | 184.58 | 707.60 | .0020 | 1,539 | SatVapor |
| 100 | 19.70 | .8500 | 452.46 | 857.62 | .0096 | 7,500 | Vap 306° |
| 102 | 81.17 | .8500 | 604.42 | 946.09 | .9789 | 763,713 | Vap 393° |

TABLE 3

TURBINE EXPANSION SUMMARY

| Group & points | | ΔH isen | ATE | ΔH turb | GΔH | ETE |
|---|---|---|---|---|---|---|
| 0, | 31–95 | 27.12 | .843234 | 22.87 | 1.03 | .8432 |
| 1, | 31–40 | 180.20 | .843234 | 151.95 | 145.08 | .8051 |
| 2, | 41–102 | 302.22 | .907885 | 274.38 | 269.30 | .8911 |
| 3, | 43–38 | 37.54 | .895478 | 33.62 | 33.36 | .8886 |
| Totals: | | 547.07 | | 482.81 | 448.78 | .8203 |

| PUMPWORK | ΔH isen | ΔH pump | Power, kWe |
|---|---|---|---|
| Main Feed Pump | 11.99 | 14.10 | 3425.55 |
| Main Boost Pump | 0.52 | 0.61 | 149.09 |
| Lean Boost Pump | 0.24 | 0.28 | 76.08 |
| Basic Pump | 0.10 | 0.12 | 69.62 |
| 1–20 Pump | 0.32 | 0.37 | 56.24 |
| 107–129 Pump | 0.28 | 0.33 | 16.75 |
| 83–82 Pump | 0.33 | 0.38 | 0.00 |
| Σ Cycle Pumps | | | 3793.33 |
| Water Pumps | 0.08 | | 1104.79 |
| Total Pumps | | | 4898.11 |
| CT Fan | | | 784.66 |
| Aux Power | | | 428.00 |
| Total Power | | | 6110.78 |

OUTPUT OF THE SYSTEM

| | |
|---|---|
| Gas turbine output | 158795.00 kWe |
| Fuel consumption (mil) | 1513.51 M BTU/hr |
| Gas turbine thermal efficiency | 35.47% |
| Gas turbine exergetical efficiency | 63.48% |
| Bottoming cycle turbine power | 102615.86 kWe |
| Combined cycle gross output | 261410.86 kWe |
| Fixed losses | 585.00 kWe |
| Combined cycle electrical output | 258843.58 kWe |
| Net plant output | 252732.81 kWe |
| Bottoming cycle net output | 95925.31 kWe |
| Overall system efficiency | 56.98% |
| Bottoming cycle gross efficiency | 39.25% |
| Gross utilization efficiency | 38.95% |
| Bottoming cycle efficiency | 36.69% |
| Available exergy of exhaust gas | 124256.17 kWe |
| Utilized exergy of exhaust gas | 122228.68 kWe |
| Exergy utilization ratio | 98.37% |
| Bottoming cycle Second Law efficiency | 78.48% |
| Bottoming cycle exergy utilization efficiency | 77.20% |
| Heat rate net | 5988.58 BTU/kWth |

What is claimed is:

1. A method for implementing a thermodynamic cycle comprising the steps of:

expanding a gaseous working fluid to transform its energy into useable form and generating a spent stream;

condensing the spent stream producing a condensed stream;

generating from the condensed stream a first stream having a higher percentage of a low boiling component than is included in the condensed stream, a second stream having a lower percentage of a low boiling component than is included in the condensed stream, and a third stream having the same percentage of a low boiling component as is included in the condensed stream;

subjecting said first, second, and third streams to multiple distillation operations to generate a liquid working fluid; and evaporating the liquid working fluid to generate the gaseous working fluid.

2. The method of claim 1 wherein said step of subjecting said first, second, and third streams to multiple distillation operations to generate a liquid working fluid includes subjecting said first, second, and third streams to multiple distillation operations to generate a vapor stream and a liquid stream;

mixing the liquid stream with the spent working fluid; and condensing the vapor stream to generate the liquid working fluid.

3. The method of claim 1 wherein said step of subjecting said first, second, and third streams to multiple distillation operations to generate a liquid working fluid includes subjecting said first, second, and third streams to at least two distillation operations.

4. The method of claim 1 wherein said step of subjecting said first, second, and third streams to multiple distillation operations to generate a liquid working fluid includes subjecting said first, second, and third streams to at least three distillation operations.

5. The method of claim 1 wherein said step of subjecting said first, second, and third streams to multiple distillation operations to generate a liquid working fluid includes the steps of:

dividing the condensed stream into first and second substreams;

increasing the pressure of the first substream to form a first pressurized substream;

increasing the pressure of the second substream to form a second pressurized substream, the pressure of the second pressurized substream being greater than the pressure of the first pressurized substream;

partially evaporating the first pressurized substream to form a partially evaporated stream;

separating the partially evaporated stream into a vapor stream and a liquid stream;

increasing the pressure of the liquid stream to the same level as the second pressurized substream to form a stream having a lower percentage of a low boiling component than is included in the condensed stream;

mixing the vapor stream with a portion of the first pressurized substream to form a composite stream having a higher percentage of a low boiling component than is included in the condensed stream;

condensing the composite stream to form a condensed composite stream;

increasing the pressure of the condensed composite stream to a level equal to that of the second pressurized substream to form a pressurized condensed composite stream; and;

heating the second pressurized substream and the pressurized condensed composite stream to form, respectively, a stream having the same composition as the condensed stream and a stream having a higher percentage of a low boiling component than is included in the condensed stream.

6. Apparatus for implementing a thermodynamic cycle comprising:

means for expanding a gaseous working fluid to transform its energy into useable form and generating a spent stream;

a condenser for condensing the spent stream producing a condensed stream;

means for generating from the condensed stream a first stream having a higher percentage of a low boiling component than is included in the condensed stream, a second stream having a lower percentage of a low boiling component than is included in the condensed stream, and a third stream having the same percentage of a low boiling component as is included in the condensed stream; and multiple distillation means for distilling said first, second, and third streams to generate a liquid working fluid; and a boiler for evaporating the liquid working fluid to generate the gaseous working fluid.

7. The apparatus of claim 6 wherein said multiple distillation means comprises means for generating a vapor stream and a liquid stream, and said apparatus further comprises a stream mixer for mixing the liquid stream with the spent working fluid and a condenser for condensing the vapor stream to generate the liquid working fluid.

8. The apparatus of claim 6 further comprising:

a stream separator for dividing the condensed stream into first and second substreams;

a first pump for increasing the pressure of the first substream to form a first pressurized substream;

a second pump for increasing the pressure of the second substream to form a second pressurized substream having a pressure greater than the pressure of the first pressurized substream;

a first heat exchanger for partially evaporating the first pressurized substream to form a partially evaporated stream;

a separator for separating the partially evaporated stream into a vapor stream and a liquid stream;

a third pump for increasing the pressure of the liquid stream to the same level as the second pressurized substream to form a stream having a lower percentage of a low boiling component than is included in the condensed stream;

a stream mixer for mixing the vapor stream with a portion of the first pressurized substream to form a composite stream having a higher percentage of a low boiling component than is included in the condensed stream;

a second condenser for condensing the composite stream to form a condensed composite stream;

a fourth pump for increasing the pressure of the condensed composite stream to a level equal to that of the second pressurized substream to form a pressurized condensed composite stream; and;

a second heat exchanger for heating the second pressurized substream and the pressurized condensed composite stream to form, respectively, a stream having the same composition as the condensed stream and a stream having a higher percentage of a low boiling component than is included in the condensed stream.

* * * * *